Patented Sept. 28, 1937

2,094,373

UNITED STATES PATENT OFFICE 2,094,373

PROCESS FOR THE MANUFACTURE OF A SYNTHETIC BALSAM BY CONDENSATION OF PHENOLS WITH ALDEHYDES

Louis Charles Frederic Pechin, Bois-Colombes, France, assignor to Brick Trust Limited, London, England, a British company No Drawing. Application September 21, 1934, Serial No. 744,912. In Switzerland September 30, 1933

8 Claims. (Cl. 260—4)

This invention relates to synthetic resin compositions and is concerned with the production, in the first place, of a primary condensation product in liquid form having properties and composition analogous to naturally occurring balsams but which can be readily hardened to give resinous compositions.

It is known that the balsams, exudation products of plants, comprise various hydrocarbon substances, mixed with esters of aromatic acids, of the constitution $C_nH_{2n-8}O_2$ or $C_nH_{2n-10}O_2$, principally the esters of benzoic and cinnamic acids. Esters such as cinnamein (benzylic benzoate and cinnamate) and stryacine (the cinnamic ester of cinnamyl alcohol) may be easily identified by analysis of these natural balsams.

Balsams have, inter alia, adhesive properties and optical properties which permit the use of certain of them, for example, Canada balsam for optical purposes. These balsams are resinified by polymerization and oxidation, and thus permit a perfect adhesion of optical glasses. The refractive indices of the combined glasses is not altered by the intervening film of balsam. But in addition to their high cost, the lack of constancy in the proportions of their constituents does not permit absolute regularity in their hardening. Furthermore, this hardening process is always long and the hardening is generally only obtained by the use of a high temperature.

One object of the present invention is the manufacture of synthetic balsams which will possess all the advantages of natural balsams without the inconveniences caused by the variability in the proportions of their constituents and which will harden at atmospheric pressure by the use of a temperature not exceeding say 180° C. and even below 100° C. according to the use for which the final product is intended.

Accordingly the present invention is for a process for the production of a synthetic resin composition which process comprises first producing a balsam-like primary condensation product in liquid form by condensing a phenol with formaldehyde in the presence of an unsaturated aromatic acid and/or benzoic acid or homologues thereof, and incorporating with the reaction product or the ingredients from which it is formed, a polyhydric alcohol and/or a hydrogenated phenol.

The invention includes the condensation of phenol with formaldehyde in the presence of cinnamic acid and/or benzoic acid and incorporating with the reaction product or the ingredients from which it is formed, a polyhydric alcohol (for example, glycerine) and/or cyclohexanol.

There may be added to the cyclohexanols, other products of hydrogenation of phenols, other mono- or poly-phenols, as also other esters of glycerine and ketones such as camphor, these substances being intended, on the one hand to serve as plastifiers, preserving or imparting to the polymerized product a sufficient elasticity and suppleness, and, on the other hand, to homogenize the polymerization.

The benzoic and cinnamic acids to which may be added other organic or mineral acids,—acetic acid, hydrochloric acid or others,—will serve as catalyzers in the process of polymerization. Under the influence of the reaction and of heat, these acids are neutralized by esterification with the polyalcohols; their catalyzing action is therefore destroyed so that further polymerization does not take place after the desired degree of hardening is attained:—furthermore, the substance obtained, although very hard, will always have a certain suppleness or resilience comparable to that of hardened natural balsams.

This chemical action distinguishes these synthetic balsams from the ordinary products obtained by condensation of phenol in the presence of formaldehyde and the polymerization subsequently of the artificial resin obtained; the presence of an excess of phenol and of basic or acid catalyzers in these latter products causing cracking after hardening, due to excessive polymerization.

Furthermore, all the plastic compositions obtained by condensation of phenols with aldehydes, when their hardening is obtained, impart on breaking a purely conchoidal fracture; they are also always of a more or less deep colour and excessively fragile requiring tools of special design especially for drilling, otherwise there is a large proportion of waste in making the finished pieces owing to breakages.

In the present invention, the presence of benzoic and cinnamic esters imparts to the material the adhesive properties of the natural balsams; the presence for example of the acetates of glycerine ensure, in addition to a decolouration of the product, very great plasticity, and, further, the presence of, for example, glycerine esters of camphoric acid enables it to adhere to all the materials comprising cellulose ethers.

The synthetic balsam thus decoloured has the same index of refraction as ordinary glass. It may, therefore, be employed in the manufacture of safety glass, either alone and hardened, as a plastic material replacing glass or as an adhesive to cement together two or more sheets of glass, which may be of different thicknesses and need not be perfectly flat, since spaces caused by the unevenness will be filled by material of similar index of refraction. The synthetic balsam may be equally well employed as an adhesive product to cement the sandwich formed by a plastic sheet of cellulosic ether or of a transparent sheet of cellulose thiocarbamate.

Finally, there may be obtained a very strong transparent material by cementing together two or more plastic sheets of hardened synthetic balsam by a certain thickness of the same synthetic balsam, but the hardening of which will be less than that of the two external sheets or even different from that of the different sheets composing the mass desired. There may also be incorporated in the synthetic balsam products which will filter a portion of the rays of light passing through a composite sheet, for example, fluorescein or bromated or halogenated fluoresceins, or salts of lead or of manganese, dissolved or in suspension. It is known that fluorescein, for example, allows the passage of the rays of a wave length of 0.530 to the infra-red, intercepting the ultra-violet, violet, and indigo chemical rays.

By means of this incorporation, this defect will be obviated, and in the case of employing synthetic balsam, either as an adhesive for safety glasses or as a spectral varnish for covering one or more sides of ordinary glasses, even of very large dimensions, the greenish colour of the said ordinary glass will be corrected.

In the case of plates or sheets of safety glass obtained simply with synthetic balsam, it will be sufficient to add a complementary colour in order to destroy the red and yellow colours which the incorporation of fluorescein brings with it.

Finally, by employing synthetic balsam for objects other than the manufacture of safety glass, there may be incorporated with it during its manufacture, carbohydrates, such as dextrins, starches or other starchy materials of the constitution of $C_6H_{10}O_5$.

The incorporation of these carbohydrates will impart to the fracture, in case of breakage of the material, a texture no longer conchoidal but simply clean and fibrous. The suppleness of the material will be increased and this will be retained even in the manufacture of moulding powders, where the articles or objects moulded will admit of easier mechanical working, giving a material less breakable than by the other processes.

As an example of execution there is heated in a laboratory flask provided with a reflux condenser, a mixture composed of—

| | Grammes |
|---|---|
| Benzoic acid | 250 |
| Cinnamic acid | 50 |
| Phenol | 500 |

To this mass will be added:

| | |
|---|---|
| Formaldehyde in the form of a 40% solution | 500 |
| Ammonia | 30 |

When the condensation products commence to form, which will be noted by taking frequent tests, there will be incorporated:

| | Grammes |
|---|---|
| Acetic acid | 190 |
| Cyclohexanol | 50 |
| Glycerine | 100 |
| Paracamphoric acid | 10 |

If, instead of obtaining a material which, when hardened, will be transparent, it is desired to produce an opaque material, plastic but very strong, there is incorporated:

Carbohydrate (dextrin etc.) _____ 100 grammes

The product is then entirely dehydrated.

In the course of manufacture of these products, natural balsams which will participate in the qualities of the synthetic balsam may be incorporated.

When it is obtained, the synthetic balsam is placed in glass jars where it will keep indefinitely. To transform it into synthetic glass or into organic crystal, it is poured into suitable moulds which are then at once plunged into boiling water which is kept at the boiling point until the desired degree of hardness is obtained,—or the said moulds are placed under a hot plate press until the material is hardened. To transform the synthetic balsam into a plastic material for industrial uses with or without the addition of carbohydrates, the moulds when filled are placed in oil heated up to 110° C. or 115° C. raised gradually up to 150° C. or more, until the desired degree of hardness is obtained.

To convert it into moulding powders, it will be mixed by known means or even without any apparatus, simply by the addition of the synthetic balsam to suitable filling materials, (sawdust, cotton waste, silk or asbestos waste etc.) and then ground and used in heated moulds and placed under presses.

The plasticity, furthermore, of the synthetic balsam is such that it can be kept sufficiently long in the liquid state, at a temperature approaching 120° C. which permits of there being incorporated in it insulating bodies the fusing point of which approaches this temperature, sulphur, particularly colloidal sulphur, for example, or any other bodies, which fused and mixed intimately with the material will impart to the synthetic balsam extremely remarkable dielectric and insulating qualities, while it is known that to be able to incorporate a very small quantity of sulphur, the processes at present known consist in mixing with the synthetic resins, diluted in alcohol, small quantities of protochloride of sulphur, and then evaporating the solvent.

According to the present invention, the insulating material itself is directly incorporated, the stability of the synthetic balsam permitting it to remain liquid for a certain time at a remarkably high temperature (115–120° C.) and thus opposing the commencement of an ebullition of the material.

Furthermore, the transparent synthetic balsam may always be given in the course of its manufacture an addition of alkaline earth sulphides (calcium, barium or strontium), or sulphide of zinc prepared in the presence of copper or bismuth, or an addition of a phosphorescent substance in which there has been incorporated a radio-active metal (radium, mesothorium, etc.) for the purpose of making a luminous plant.

The plastic materials obtained with the synthetic balsam thus made luminous, will be remarkable from the point of view of phosphorescence, for the said sulphides, intimately mixed with the mass, will profit by the qualities of refraction of the transparent synthetic balsam, in other words, the alkaline earth or zinc sulphides, which have a certain fluorescent power when they are taken alone, will have their qualities of luminosity considerably increased as soon as they are incorporated with the synthetic balsam, in its liquid or pasty form and then polymerized.

The somewhat considerable quantity of the said sulphide which the synthetic balsam forming the object of the present invention permits of agglomerating, will produce plastic matters which may be utilized for therapeutical purposes.

Rubber may be incorporated into the synthetic balsam produced according to the invention, for instance, by increasing the proportion of cyclohexanol in the example given hereinbefore until there is sufficient excess to render the rubber compatible with the synthetic balsam. It is known that rubber is constituted principally by hydrocarbons which, after a long and arduous series of operations, can be deprived of the impurities which they contain, and then give a clear, insulating, elastic, plastic material as transparent as glass, and it will be this material which is incorporated with the synthetic balsam thus specially prepared.

It is to be understood that all the proportions above indicated are only given by way of example, and they can vary within wide limits, without thereby departing from the scope of the present invention or modifying the characteristics thereof.

The synthetic balsam permits of novel industrial applications, and according to the composition of its constituents and of the physical or chemical phenomena which they create or produce, it must be considered as a novel industrial product.

What I claim and desire to secure by Letters Patent of the United States is:—

1. A process for the production of a potentially reactive synthetic resin composition which comprises first producing a balsam-like condensation product in liquid form by condensing a phenol with formaldehyde in the presence of ammonia in quantity insufficient to neutralize the acid, benzoic and cinnamic acids and incorporating in the early stages of the condensation reaction glycerine and cyclohexanol together with glycerine esters of acetic and camphoric acid to act as decolourizing agents.

2. A process for the production of a potentially reactive synthetic resin composition which comprises first producing a balsam-like condensation product in liquid form by condensing a phenol with formaldehyde in the presence of a volatile basic condensation agent in quantity insufficient to neutralize the acid and a saturated and an unsaturated aromatic carboxylic acid and incorporating at any stage of the reaction a polyhydric alcohol and a hydrogenated phenol and heating the reaction product to bring about polymerization.

3. A process for the production of a potentially reactive synthetic resin composition which comprises first producing a balsam-like condensation product in liquid form by condensing a phenol with formaldehyde in the presence of ammonia in quantity insufficient to neutralize the acid and benzoic and cinnamic acids and incorporating in the early stages of the condensation reaction glycerine and cyclohexanol, and heating the reaction product to bring about polymerization.

4. Transparent material comprising the polymerized resinous condensation product of a phenol with formaldehyde in the presence of ammonia in quantity insufficient to neutralize the acid, benzoic and cinnamic acids with which has been incorporated in the early stages of the condensation reaction glycerine and cyclohexanol.

5. A composite material consisting of a plurality of layers of transparent material as claimed in claim 4 united by a layer or layers of the same material polymerized to a lower degree of polymerization.

6. A process for the production of a potentially reactive synthetic resin composition comprising the production of a balsam-like condensation product in liquid form by condensing a phenol with formaldehyde in the presence of cinnamic and benzoic acid and ammonia in quantity insufficient to neutralize the acid, and incorporating in the early stages of condensation reaction glycerine and cyclohexanol, characterized by incorporating with the reaction product after the condensation reaction a carbohydrate of the type represented by the general formula $(C_6H_{10}O_5)x$.

7. A process for the production of a potentially reactive synthetic resin composition comprising the production of a balsam-like condensation product in liquid form by condensing a phenol with formaldehyde in the presence of cinnamic and benzoic acid and ammonia in quantity insufficient to neutralize the acid, and incorporating in the early stages of condensation reaction glycerine and cyclohexanol, characterized by incorporating dextrine with the reaction product after the condensation reaction.

8. A process according to claim 7, wherein colloidal sulphur is incorporated with the product.

LOUIS CHARLES FREDERIC PECHIN.